United States Patent
Sachedina et al.

(10) Patent No.: US 7,085,911 B2
(45) Date of Patent: Aug. 1, 2006

(54) RESIZABLE CACHE SENSITIVE HASH TABLE

(75) Inventors: Aamer Sachedina, Newmarket (CA); Matthew A. Huras, Ajax (CA); Keriley K. Romanufa, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 10/422,925

(22) Filed: Apr. 23, 2003

(65) Prior Publication Data

US 2003/0204698 A1    Oct. 30, 2003

(30) Foreign Application Priority Data

Apr. 29, 2002    (CA)    ................................ 2384185

(51) Int. Cl.
*G06F 12/06*    (2006.01)

(52) U.S. Cl. .................. 711/206; 711/205; 711/201; 711/217; 707/509

(58) Field of Classification Search ................ 711/216, 711/202, 205, 207, 201, 217, 118; 707/100, 707/509, 101, 102, 2
See application file for complete search history.

(56) References Cited

U.S. PATENT DOCUMENTS

| 4,464,713 | A |   | 8/1984  | Benhase et al. |         |
|-----------|---|---|---------|----------------|---------|
| 5,592,392 | A |   | 1/1997  | Matheson et al.|         |
| 5,630,008 | A | * | 5/1997  | Okuyama et al. | 388/804 |
| 5,687,361 | A | * | 11/1997 | Sarkar         | 707/1   |
| 5,706,462 | A |   | 1/1998  | Matousek       |         |
| 5,797,004 | A |   | 8/1998  | Lindholm et al.|         |
| 5,835,756 | A |   | 11/1998 | Caccavale      |         |
| 5,893,086 | A |   | 4/1999  | Schmuck et al. |         |
| 5,960,434 | A | * | 9/1999  | Schimmel       | 707/100 |
| 6,035,326 | A |   | 3/2000  | Miles et al.   |         |
| 6,052,697 | A |   | 4/2000  | Bennett et al. |         |
| 6,052,698 | A |   | 4/2000  | Bennett et al. |         |
| 6,057,547 | A | * | 5/2000  | Park et al.    | 250/307 |
| 6,233,621 | B1|   | 5/2001  | Joy            |         |
| 6,308,246 | B1|   | 10/2001 | Hagersten et al.|        |
| 6,732,116 | B1| * | 5/2004  | Marquardt et al.| 707/102|
| 6,862,602 | B1| * | 3/2005  | Guha           | 707/101 |
| 2003/0084057 | A1| * | 5/2003 | Balogh        | 707/100 |

FOREIGN PATENT DOCUMENTS

| JP | 61048034 | 3/1986 |
| JP | 10091501 | 4/1998 |

OTHER PUBLICATIONS

Witobl Litwin "Virtual Hashing: A Dynamically Changing Hashing," P (517-523) Sep. 1978.*
Szymanski, T.G., "Hash Table Reorganization," Journal of Algorithms, 6(3), 322-335 (1985).*

(Continued)

*Primary Examiner*—Pierre-Michel Bataille
(74) *Attorney, Agent, or Firm*—Sawyer Law Group LLP (57) ABSTRACT

A hash table for a collection of data items includes a set of hash buckets, each hash bucket being associated with a subset of the collection of data items, and a set of properties entries in each of the hash buckets. Each properties entry includes a pointer to an associated data item in the subset associated with the bucket and a set of representative values identifying the associated data item. A hash table can also include bucket groups defining a second level hash table to permit resizing of the hash table.

39 Claims, 2 Drawing Sheets

OTHER PUBLICATIONS

"Method for Organizing a Hash Table," *IBM Technical Disclosure Bulletin*, vol. 38, No. 2, Feb. 1995.

Boyer, John. "Resizable Data Structures," *Dr. Dobb's Journal*, Jan. 1998, pp. 115-116, 118, 129.

Griswold, William G. and Townsend, Gregg M. "The Design and Implementation of Dynamic Hashing for Sets and Table in Icon," *Software—Practice and Experience*, Apr. 1993, pp. 351-367.

* cited by examiner

RESIZABLE CACHE SENSITIVE HASH TABLE

FIELD OF THE INVENTION

The present invention is directed to an improvement in computing system data structures and in particular to improvements in defining dynamically resizable cache sensitive hash tables.

BACKGROUND OF THE INVENTION

Computer systems often make use of hash tables to optimize data searches. Hash tables are widely used in computer program products as this construct can be used to provide fast access to many different kinds of data structures.

Data items referenced by a hash table are characterized uniquely using some properties of the data (the use of multiple properties to uniquely identify such data is common). For a hash table referencing a given data set "S", the design and logic used to access the hash table will permit a computer program product to either locate target data ("D") or determine that it does not exist in "S". For a set "S" containing N data items, if a linear search is performed (comparing each item individually to "D"), such a search could in the worst case scenario (where "D" is not present in the data set), require accessing all N items in the set "S".

A hash table is a table of a size which is typically much smaller than N. Hash tables are typically rounded to a size X which is either a prime number or the next power of 2 (still typically much smaller than N).

To implement a particular hash table, a hash function is selected based on properties identifying each data item "D". The hash function may be applied to any data item "D" to generate a hash value. The properties used as an input to the hash function can be a subset of the total properties necessary to uniquely identify each data item. In typical applications, the hash value is the size of a word (often 32 or 64 bits). A hash index can then be generated from the hash value using modulo arithmetic carried out on the hash values of the elements in "S". This is expressed as HASHVALUE % X=HASHINDEX (X is the size of chosen for the hash table).

Any data item "D", being defined by a unique set of properties, some or all which are used in generating its hash value (and then ultimately through the hash value in its hash index), can thus only map to one entry in the hash table. Each entry in a hash table, and the associated data items, is called a hash bucket or bucket.

Multiple threads (or processes), may access a hash table and the associated data items at any given time. In a typical application, such as a database system main memory buffer system, the set of database pages (or their header or directory information) that are present in main memory may be hashed. Typically in such an application the hash bucket contains a pointer to a first data item. Data items themselves include pointers that permit them to be arranged in a linked list. Adding an item to a hash table is accomplished by placing the item in the appropriate linked list pointed to by the appropriate bucket in the hash table.

A thread looking for a particular page "D" in the buffer system would calculate the hash index of that page and perform a lookup in the hash table to determine if the page is in the database's main memory buffer. If it is not present in the hash table buckets (the pointer in the hash table bucket points to a linked list and the linked list does not contain the page) then the thread will cause the required page to be read from disk to the main memory buffer. The page will be added to the linked list pointed to by the appropriate hash bucket so that the next thread that is looking for the same page will be able to use the hash table to locate the page in the memory buffer.

Hash tables are typically kept consistent by the use of concurrency primitives called latches, with one latch for each hash bucket. This latch is often called the bucket latch. Threads wishing to parse contents (the data items in the associated linked list) of a particular hash bucket will take the bucket latch to ensure that the contents of the bucket remain consistent while the threads access items in the bucket. A thread inserting a new item into a linked list pointed to by a bucket will obtain the bucket latch to ensure that no other threads are parsing through the linked list of the bucket while the thread modifies the content of the bucket or the linked list. The bucket latch is often implemented as a full function latch where threads that are parsing through the contents of the bucket take the latch in share mode (so that multiple threads can look at the contents of a bucket concurrently), while those that are inserting or removing data items into a bucket take the latch in exclusive mode. As the above indicates a hash table bucket may include a latch and a pointer to the first data item in the linked list of data items that is related to that bucket.

The ability to handle concurrency in a hash table implementation becomes important when a hash table is resized. Resizing is desirable when the number of data items in the table becomes large relative to the number of buckets (causing the number of data items in the linked list for each bucket to grow). The most straightforward way to carry out a resizing operation is to first lock out all threads accessing the hash table and then to redistribute the data in the table. This can be done by creating one new latch (in addition to the existing bucket latches) for the entire hash table (or alternatively, by latching all buckets). Threads wishing to use the hash table would have to take the entire hash table latch (in share mode) before proceeding to access the bucket of interest. This is not a desirable approach because it locks out all users of the hash table during the resize.

Another approach avoids having to latch the whole hash table. Following this approach, each bucket is individually split (typically a binary split). In this approach, each bucket data structure includes a bit indicating whether the bucket is split or not, as well as data that pointing to the new buckets, if any. This approach is also limited. For example, the granularity of the split is limited in this case. In addition, it is typical for a thread or process accessing a particular hash table to store a copy of a calculated hash index value in a local variable or a register (this is referred to as maintaining a cached copy of the index value). Keeping the hash index value in a local variable or register in this way permits the thread or process to access the data item using the hash table without having to recalculate the hash index for the data item. Where a bucket is split as described above, any stored index values must be discarded, as they will no longer be reliable.

A hash table is itself typically implemented as a contiguous piece of computer memory (an array of 0 to X−1 hash bucket elements). The structure of each hash bucket in the generic hash table has two contents, i) the bucket latch and ii) a pointer to the start of the linked list of data items present in the bucket. Two adjacent buckets (e.g. 0 and 1), are thus separated by sizeof (Latch)+sizeof (FirstDataItemPtr). On a typical 32-bit computer system, a simple Latch is 4 bytes and a pointer in memory is also 4 bytes. The size of a hash bucket is therefore typically 8 bytes. Thus the starting points of two adjacent buckets (and hence two adjacent latches) would only be separated by 8 bytes of memory.

Since a typical data cache line on modern computer systems is 128 bytes (dependant on the processor architecture), the end result is that multiple buckets (and hence multiple bucket latches) will exist on the same cache line. On Symmetric Multi Processor (SMP) computer systems, multiple processors share the same main memory resources and have physically separate data caches (each processor typically has a data cache on the processor chip itself). As a result, on such systems there is a concept of cache line ownership. Since the data in the cache line is really shared data, expensive cache synchronization must occur across the processors to ensure that any cache lines that exist in more than one processor's cache are consistent.

Since any thread T0, running on processor P0 accessing bucket 0 must take that bucket's latch, the processor P0 will take ownership of the cache line that the latch exists in (since the latch is marked as "Taken", the cache line has been "Dirtied" by processor P0). Thread T1, running on processor P1 accessing bucket 1 (a completely separate bucket) must "take" that bucket's latch, causing the processor to dirty the same cache line that P0 owns. This results in expensive cache synchronization across P0 and P1 (in some schemes, P0 will have to provide the updated cache line to P1 by snooping the bus to see when P1 requests the cache line). The net result is that even though the two threads T0 and T1 are accessing separate buckets, which are protected by separate latches, because the latches are on the same cache line, a false sharing of the latches occurs as a result of the cache line effects. The caching of the hash table is therefore less efficient than could otherwise be the case. The common approach to address this issue is to pad each bucket with unused bytes so that each bucket is on its own cache line. If there is an 8 byte bucket size and a 128 byte cache line, there will be 120 unused bytes for each bucket.

Another aspect of hash table operation that affects the efficiency of a hash table is the frequency of cache misses. A cache miss occurs when a thread or process seeks to access a bucket or the data items in the linked lists pointed to by the hash table but the item is not present in the cache. This is typically the case when a process or thread "walks" the linked list of data items. Accessing each item in the linked list will typically result in a CPU stall as a result of the cache line being accessed not being present in the data cache. This is inefficient as CPU cycles are wasted in waiting for the data items in the linked list (not cached) to be read from main memory.

It is therefore desirable to have a method and system for hash table creation and maintenance that permits hash tables to be dynamically resized and that provides improved performance of hash tables by minimizing cache line misses.

SUMMARY OF THE INVENTION

According to one aspect of the present invention there is provided an improved method and system for providing dynamically resizable, cache sensitive hash tables.

In another aspect, a method for providing a hash table for a collection of data items includes providing a set of hash buckets in the hash table, each hash bucket being associated with a subset of the collection of data items, and providing a set of properties entries in each of the hash buckets. Each properties entry includes a pointer to an associated data item in the subset associated with the hash bucket and a set of representative values for the associated data item, where the set of representative values identifies the data item. A system includes means for providing the above features.

In another aspect, a method for generating a hash table for a collection of data items includes defining a set of hash buckets, generating, for each data item, a properties entry associated with the data item, and storing each properties entry in a selected one of the hash buckets in a linked list of properties entries. The properties entry includes representative values for the data item and a pointer to the data item, and the selected one of the hash buckets is determined by a hash value of the data item associated with the properties entry.

In another aspect, a computer readable medium includes program instructions to be implemented by a computer for generating and maintaining a hash table for a collection of data items, the hash table comprising a set of bucket groups and hash buckets, each bucket group including a latch for the bucket group, a set of inline hash buckets, and a group header comprising a pointer definable to point to an array of overflow hash buckets.

In another aspect, a method for generating a hash table for a collection of data items, where the hash table includes a set of bucket groups and hash buckets, includes defining each of the bucket groups to include a latch for the bucket group, a set of inline hash buckets, and a group header comprising a pointer definable to point to an array of overflow hash buckets, and defining each hash bucket to comprise a set of properties entries. Each properties entry comprising a pointer to an associated data item in the subset associated with the hash bucket and a set of representative values for the associated data item, where the set of representative values identifies the data item.

In another aspect, a method for generating and maintaining a collection of data items includes providing a hash table, and defining hash buckets in the hash table, the hash buckets storable in alignment with cache line boundaries in a specified data cache.

In another aspect, a system for providing a hash table for a collection of data items, includes means for providing a set of hash buckets in the hash table, each hash bucket being associated with a subset of the collection of data items; and means for providing a set of properties entries in each of the hash buckets, wherein each properties entry includes a pointer to an associated data item in the subset associated with the hash bucket, and a set of representative values for the associated data item, wherein the set of representative values identifies the data item.

In another aspect, a computer readable medium includes program instructions to be implemented by a computer for providing a hash table for a collection of data items, the program instructions performing steps including providing a set of hash buckets in the hash table, each hash bucket being associated with a subset of the collection of data items, and providing a set of properties entries in each of the hash buckets. Each properties entry includes a pointer to an associated data item in the subset associated with the hash bucket and a set of representative values for the associated data item, wherein the set of representative values identifies the data item.

Advantages of the present invention include, but are not limited to, hash table definition and use to reduce cache misses and to permit flexible resizing of the hash table buckets without requiring exclusive control of the entire hash table.

DETAILED DESCRIPTION

The present invention provides an improved method and system for providing dynamically resizable, cache sensitive hash tables. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
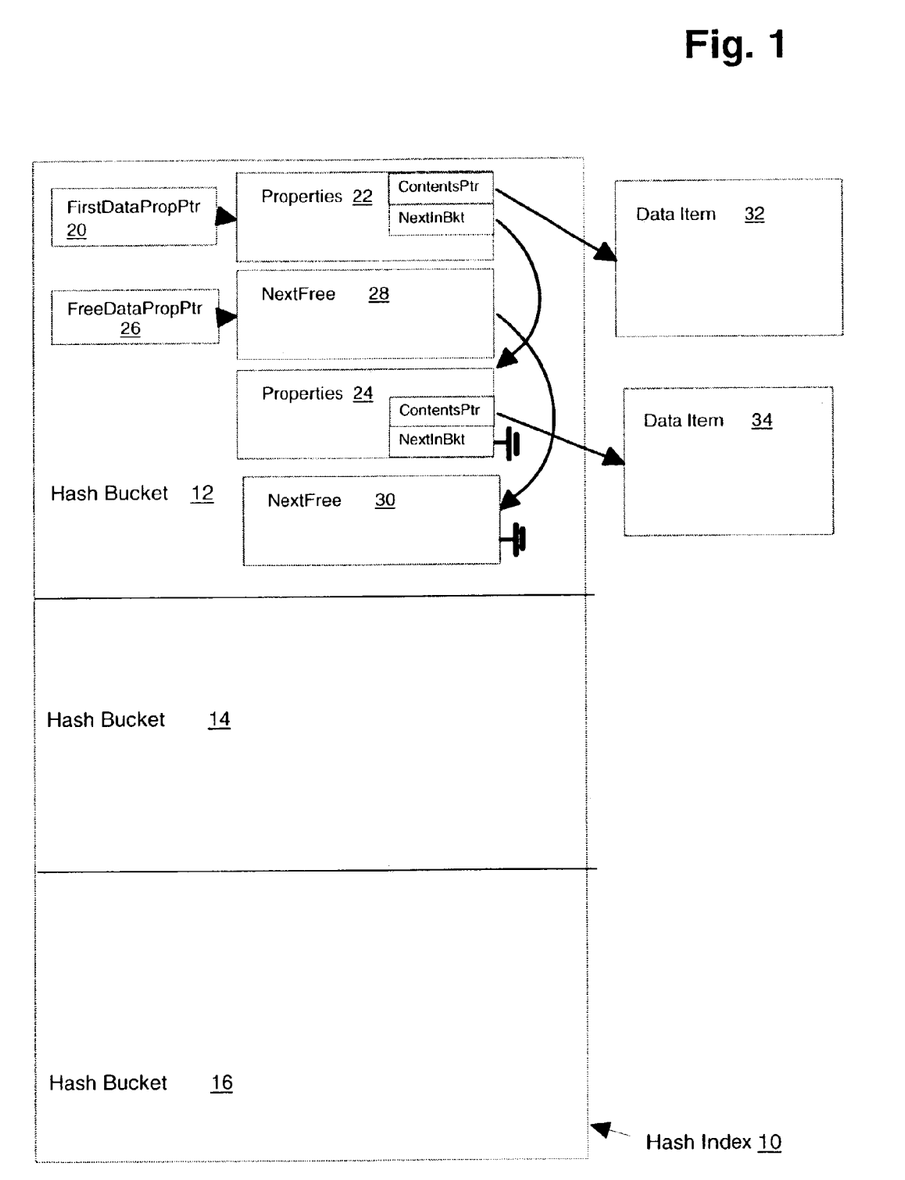
FIG. 1 is a block diagram showing the structure of an example cache sensitive hash table and related data organized in accordance with the preferred embodiment.

The structure of the cache sensitive hash table of the preferred embodiment is shown with reference to the example of the block diagram of FIG. 1. As will be apparent from the following description, FIG. 1 relates to the cache sensitive aspect of the hash table of the preferred embodiment. The aspect of the preferred embodiment relating to the resizability of the hash table is illustrated with respect to FIG. 2. Those skilled in the art will appreciate that the hash table of the preferred embodiment includes both cache sensitive and resizable characteristics, although a different embodiment according to aspects of the present invention need not include both these features.

FIG. 1 shows hash table 10 having hash buckets 12, 14, 16 (detailed illustration of the structure of hash bucket entries 14, 16 is omitted in FIG. 1). According to the preferred embodiment, each data item "D" that is referenced by the hash table is represented in two parts: a data properties item and a data contents item. A data properties item contains some or all of the properties necessary to uniquely identify the original data item "D" (these properties form a set of representative values for the associated data item "D"). A data contents item contains the remainder of the contents of the original data item "D" (in the preferred embodiment this includes a second copy the data properties, so that the data contents item is the same as the original data item "D"). Data properties items are optimized for size (smaller is preferred), by selectively picking the minimum set of properties that will, in most cases, be sufficient to identify "D".

It should be noted that the identification of "D" through data properties items does not necessarily have to be unique. A non-unique identification can be used to keep the size of the data properties items to within a fraction of the total cache line size. In the case that the identification is non-unique, failing to find a match when seeking a given set of data properties values will mean that there is no corresponding data item pointed to by the hash table bucket. However, finding a match with one of the data properties items does not indicate that the data item is necessarily pointed to by the hash table bucket. The consequences of this non-unique correspondence are that in those cases, additional accesses to data items (and likely cache misses) will be required to access the data contents items to confirm the existence of the data item in the hash table set. As will be apparent to those skilled in the art, the selection of the properties used to identify the data items will depend on the data being accessed using the hash table. For economy of cache resources, the smaller the set of properties used, the better. However, in the preferred embodiment, the set of properties is larger than the set of properties used to generate the hash values for the hash table (where these sets of properties are the same, the additional properties items provide no functional advantage).

As indicated above, the preferred embodiment includes data properties items and data contents items. In the preferred embodiment, the hash table itself points to the data contents items and keeps the corresponding set of properties in the hash table itself (in the preferred embodiment the data contents items are complete data items, from which a subset of properties are copied to the data properties items in the buckets of the hash table). As shown in the example of FIG. 1, hash bucket 12 contains a linked list of items storing the properties of corresponding data items referenced by the bucket. The link list of properties is anchored by first data property pointer 20 in hash bucket 12. In the example of FIG. 1 the first data property pointer 20 points to properties entry 22 containing the property values ("Properties"), a pointer to the next item in the linked list ("NextInBkt") and a pointer to the contents portion of the entry in the hash bucket ("ContentsPtr"). In the example of FIG. 1, entry 22 points to properties entry 24 and to data item 32. Properties entry 24 points to data item 34.

As may be seen in the example of FIG. 1, the data items themselves are not directly within the buckets in the hash table in the preferred embodiment. Rather, the buckets contain pointers to the data items (properties entry 22 points to data item 32, for example). Although the data items are not maintained within the data structure of the hash table, the terminology of the art refers to data items as being "in a hash table" or "in a bucket" where the data item is within a linked list pointed to by the bucket in the hash table. In this description, it will be understood that when a data item is described as being in a bucket, or the number of data items in a bucket is referred to, the data items are, in fact, pointed to by the data structure the implements the buckets, rather than being within the data structure of the bucket. In the preferred embodiment, it is the properties entries that are stored within the buckets. This distinction is significant for the caching that is done with hash table entries as the properties entries are, by definition, intended to be smaller than the data items to which they relate.

A pool of unused data properties entries is kept on a per bucket basis, within the bucket data structure. This is shown in FIG. 1 where hash bucket 12 maintains a list of free entries in the properties table. Free data properties pointer 26 anchors this linked list and in the example of FIG. 1 points to entry 28. Entry 28 has a next free pointer (NextFree) shown in FIG. 1 pointing to entry 30. In the preferred embodiment, the linked lists in the buckets are implemented to minimize the space in the cache line required to store the items in the linked lists and the pointers between items in the lists. The implementation used will depend on the available space on the cache line and other system details. Options include defining the linked list to be an array allocated within the cache line and pointers to be indexes into the array (of a byte or less in length). Another option is to allow for an overflow area to which the pointers of the linked list may point. A defined set of (upper order) bits in the pointer can be used to indicate whether the data item is in the main cache line or in one or more overflow spaces (and if so, in which one).

In the preferred embodiment, each hash bucket is defined to commence on a cache line boundary and to be less than one cache line in size. Requiring buckets to be arranged in this manner avoids the problem of false latch sharing that can occur when multiple buckets are stored on the same cache line.

By defining buckets to be aligned with cache line boundaries the effective minimum size of a bucket becomes the size of a cache line. As many cache lines are 128 bytes in length, the pool of unused properties entries (and its control structures) can be allocated from the bucket in most systems without extending the size of the bucket. The space occupied by the properties entries (both used and unused) is in many cases part of the bucket that would have otherwise been unused.

When a new item "D" is to be added to the data items in the hash table (added to the data items pointed to by the bucket), a data properties entry from the free pool is located, the properties of "D" are copied into it, and the entry is added to the properties entries linked list. A pointer to the contents data item is also added to the properties entry.

The number of data properties entries in the free pool for each bucket is calculated with reference to the average load factor of a bucket, assuming uniform distribution of hash values. In the event that a given bucket ends up not having uniform distribution of hash values, an additional pool of unused data properties entries can be maintained to be used as an overflow pool. The additional pool can be further optimized by not allocating it until necessary (until a bucket is identified that requires an overflow properties entry). Another optimization involves allocating an entire additional cache line of free data properties for the bucket in question as the overflow pool. The requirement for such optimization steps for the overflow pool of data properties entries is dependant on the uniformity of distribution of hash values.

In most applications, a search for a data item "D" in a hash table is effectively bottlenecked by processor stalls that result from cache misses. In the worst-case scenario (when item "D" is not present in the data set), even after missing in all the individual data items in the given bucket, item "D" will still not be found and will have to be inserted into the linked list.

The result of the preferred embodiment design of hash table is that the number of cache misses is reduced. On most systems, where the distribution of hash values is uniform (or predictable), and enough data properties entries can be accommodated within the hash bucket memory (the extra memory which results from the padding to avoid false sharing of latches), only one cache line miss is encountered (the bucket itself will be loaded to the cache) when searching for any data item "D" in the hash table. The preferred embodiment has the potential to eliminate any additional cache misses (and the resulting processor stalls) that are incurred by a processor when a thread searches for a data item which is not currently in the hash table. In this sense the preferred embodiment is said to be "cache sensitive". The design of hash table in the preferred embodiment is able to support redistribution of data items in the buckets of the table. If the size of the underlying data set (size N) increases, and the hash table is not resized, the average load factor (N/X—where X is the size of the hash table) will increase, resulting, on average, in more time being required for searching through a hash bucket.

The design of the preferred embodiment relies on the fact that there will likely be unused bytes available in each hash bucket, given the requirement that each bucket be aligned with cache line boundaries. The available data space in the bucket is used to create a two-level hash table which facilitates resizing of the hash table.

Figure 2:
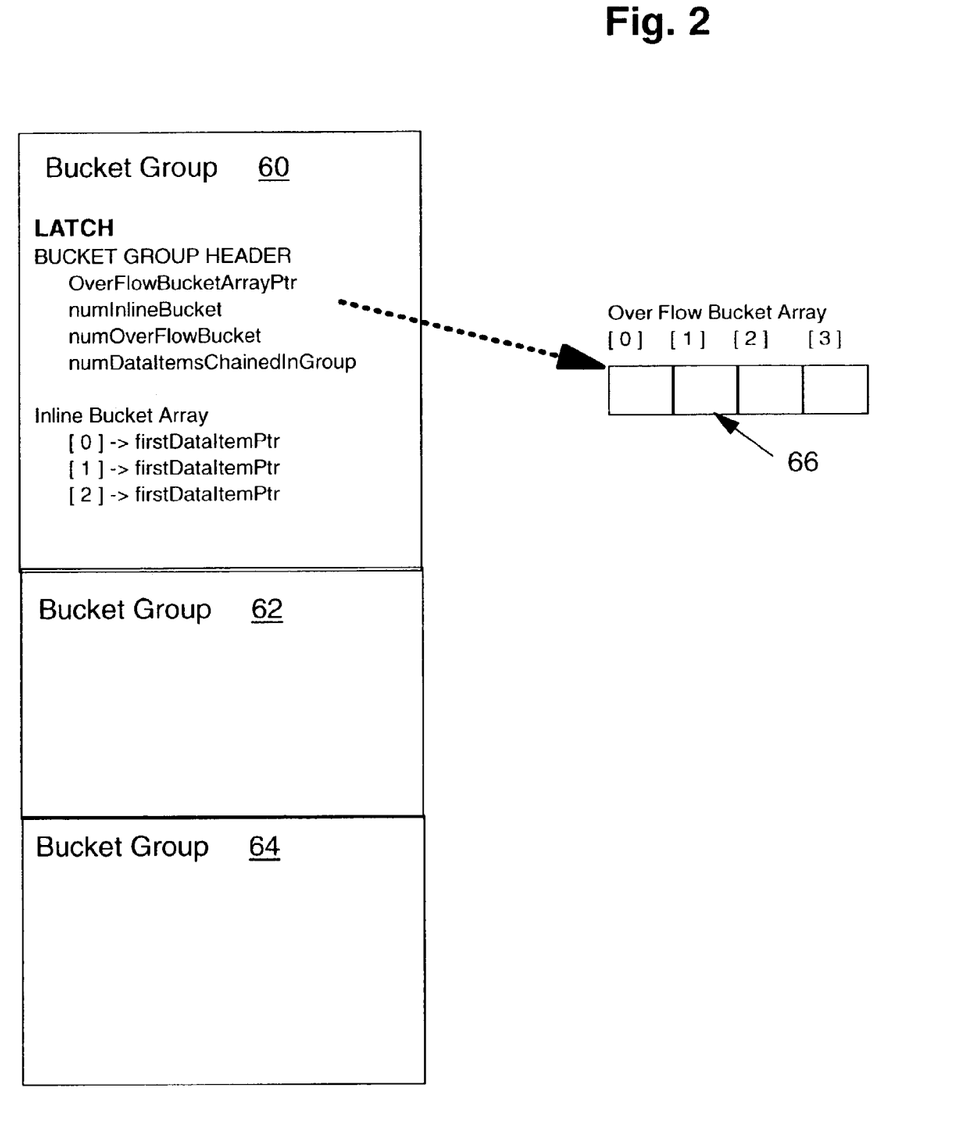
FIG. 2 is a block diagram showing the structure of an example resizable hash table in accordance with the preferred embodiment.

FIG. 2 shows the structure of the hash table of the preferred embodiment, at a level illustrating the two-level structure of the hash table. The hash table of the preferred embodiment is comprised of a fixed set of X hash bucket groups (rather than a fixed set of X hash buckets). FIG. 2 shows the groups by example as bucket groups 60, 62, 64 (the contents of bucket group 60 are shown, contents for bucket groups 62, 64 are omitted). Each hash bucket group contains one latch which controls access to all the hash buckets within the group. The number of hash bucket groups—X—(and hence the number of latches) is related to the maximum number of threads that can exist in the system at any given time. Each hash bucket group is cache line aligned and some of the available bytes left as a result of the padding are used for a fixed number of inline hash buckets that will fit in to the hash bucket group. FIG. 2 shows bucket group 60 with an inline bucket array of three buckets (0, 1, 2). It will be appreciated that, although not illustrated in the simplified presentation of FIG. 2, the arrangement of the inline array of buckets in the preferred embodiment conforms to the structure shown in FIG. 1.

As indicated in FIG. 2, a number of bytes in each hash bucket group are used for a hash bucket group header which is used for the management of each hash bucket group, as is described below. The header points to an overflow bucket array, when required (overflow bucket array 66 in FIG. 2). When a hash table of the preferred embodiment is initially created, there is no overflow bucket array for each hash bucket group.

In the preferred embodiment, the initial number of bucket groups in the hash table (X) is based on two things:

1. The number of threads that can co-exist in the system, and
2. The product of X and the number of inline buckets per bucket group should be large enough to achieve the desired LOAD FACTOR.

In the preferred embodiment, the number of inline buckets is dependent on how many bytes are left for cache line padding in the hash bucket group.

In operation, the hash table of the preferred embodiment is accessed by a thread seeking to locate, add or remove a data item D in the following manner:

The thread determines which hash bucket group the data item D maps to using modulo arithmetic based on the number of hash bucket groups X (this is similar to the calculation carried out for a single-level hash table described above).

The thread obtains the latch for the hash bucket group (in SHARE mode if the thread is searching for a data item and in EXCLUSIVE mode if the thread inserting or removing data item D). If the thread is inserting or removing a data item D then it updates the numDataItemsChainedInGroup accounting variable.

Within each hash bucket group is a small sized hash table (the second level of the two-level hash table). The number of buckets in this hash table is "numInlineBucket+numOverFlowBucket" (the total number of buckets in the group). To determine the appropriate bucket to access to determine the presence of D or where D should be added, a second hash function is applied and modulo arithmetic is performed based on the size of this second level hash table to map to the appropriate bucket.

When the hash table is initially allocated, it is sized appropriately (the appropriate X is selected), so that no overflow buckets are required. Overflow buckets are part of a separate cache line and therefore accessing the overflow bucket array causes a cache miss. Overflow buckets are used in the design of the preferred embodiment when a hash bucket group is resized. This takes place by allocating an overflow bucket array (such as overflow bucket array 66 in FIG. 2). Data items within the hash bucket group may then be redistributed over the new buckets using the new hash function resulting from increasing the size of the second level hash table within the hash bucket group.

In the design of the preferred embodiment, each hash bucket group is separately resizable.

In a simple case requiring a resize (as a result, for example, of the size of the underlying data set changing), one thread can be assigned to resize all the buckets. This thread starts with a first hash bucket group and selects all the bucket groups in turn. As the thread processes each hash bucket group it obtains the latch for the bucket group in EXCLUSIVE mode. Thus locking out other threads from accessing the bucket group being processed, but no other bucket group. The thread allocates (or reallocates in the event there is already an overflow array) a new overflow array, updates the bucket group header data that records the number of overflow buckets (numOverflowBucket) and re-distributes the buckets in the bucket group.

The design of the preferred embodiment can be used for bucket group resizing such that the resizing occurs asynchronously based on running conditions. Using this approach, a special worker thread periodically scans each the hash bucket group and calculates its load factor using the numDataItemsChainedInGroup accounting variable referred to above. If the load factor is too high or too low (in comparison with a defined threshold) for a given bucket group then the worker thread latches the bucket group and resizes only that group.

In an alternative approach, special worker thread is not needed. In this implementation of the preferred embodiment, any thread using a bucket group that obtains an EXCLUSIVE mode latch on a bucket group will determine if the group needs resizing (a good Samaritan approach). Since threads that are adding or removing an item in a bucket group need to obtain a latch in EXCLUSIVE mode, the additional cost to perform the resizing check is not high.

This technique of resizing is useful where the distribution of data is not uniform. Each bucket group can be a different size.

In the preferred embodiment, only the hash bucket group indexes (the first level of the hash table) are cached. Since the first level hash table is not resized, then there is no need to invalidate any copies of index values made by accessing threads or processes (in local variables or registers, for example), when the table is resized. As the copy of the index value stored in a local variable or register is referred to as a cached copy of the hash index value, this aspect of the preferred embodiment may be considered to be "cache sensitive" feature.

In summary, according to one aspect of the present invention, there is provided a hash table for data items that has two levels, the levels being made up of hash buckets and bucket groups. The hash buckets in the hash table are both inline in the bucket groups and in overflow arrays pointed to by the bucket groups. The hash buckets have properties entries arranged in a linked list in each bucket. Each property entry contains a pointer to a data item and representative values for the data item to which it points. Other aspects are detailed above.

Although a preferred embodiment of the present invention has been described herein in detail, it will be appreciated by those skilled in the art that other variations may be made. Such variations may be made without departing from the spirit of the invention or the scope of the appended claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing a hash table for a collection of data items, the system comprising:

means for providing a set of hash buckets in the hash table, each hash bucket being associated with a subset of the collection of data items, and wherein said hash table includes a set of bucket groups, each bucket group including a latch for the bucket group, a set of inline hash buckets, and a group header comprising a pointer definable to point to an array of overflow hash buckets;

means for providing a set of properties entries in each of the hash buckets, wherein each properties entry includes a pointer to an associated data item in the subset associated with the hash bucket, and a set of representative values for the associated data item, wherein the set of representative values identifies the data item; and means for carrying out a resizing of the hash table, including:

means for obtaining the latch for a selected bucket group in exclusive mode;

means for allocating a memory location for an array of overflow buckets;

means for updating the overflow pointer in the group header for the selected bucket group to point to the memory location; and means for redistributing buckets in the inline hash buckets and the array of overflow buckets.

2. The system of claim 1 wherein the hash buckets are storable in alignment with cache line boundaries in a specified data cache.

3. The system of claim 1 wherein the set of properties entries in each hash bucket is maintained in a linked list.

4. The system of claim 3 wherein a set of unused entries in each hash bucket is maintained in a linked list.

5. The system of claim 1 further comprising defining each bucket group to be storable in alignment with cache line boundaries in a specified data cache.

6. The system of claim 1 in which resizing the hash table includes:

means for launching an asynchronous thread to carry out the resizing, wherein the asynchronous thread determines the load factor for a selected bucket group; and means for resizing the selected bucket group if the load factor is higher or lower than predefined thresholds.

7. The system of claim 6 wherein the thread acquires the latch for the selected bucket group in exclusive mode to carry out an updating operation on the bucket group.

8. A system for providing a hash table for a collection of data items, the system comprising:

means for providing a set of hash buckets in the hash table, each hash bucket being associated with a subset of the collection of data items, and wherein said hash table includes a set of bucket groups, each bucket group including a latch for the bucket group, a set of inline hash buckets, and a group header comprising a pointer definable to point to an array of overflow hash buckets, wherein the number of bucket groups in the hash table is based on the number of threads in the computer system, and on a limit defined such that a specified load factor for the hash table is no larger than the product of the number of bucket groups and the number of inline buckets in each hash bucket; and means for providing a set of properties entries in each of the hash buckets, wherein each properties entry includes a pointer to an associated data item in the subset associated with the hash bucket, and a set of representative values for the associated data item, wherein the set of representative values identifies the data item.

9. The system of claim 8 wherein the hash buckets are storable in alignment with cache line boundaries in a specified data cache.

10. The system of claim 8 further comprising defining each bucket group to be storable in alignment with cache line boundaries in a specified data cache.

11. A method for providing a hash table for a collection of data items, the method comprising:
(a) providing a set of hash buckets in the hash table, each hash bucket being associated with a subset of the collection of data items, and wherein said hash table includes a set of bucket groups, each bucket group including a latch for the bucket group, a set of inline hash buckets, and a group header comprising a pointer definable to point to an array of overflow hash buckets;
(b) providing a set of properties entries in each of the hash buckets, wherein each properties entry includes a pointer to an associated data item in the subset associated with the hash bucket and a set of representative values for the associated data item, wherein the set of representative values identifies the data item; and
(c) carrying out a resizing of the hash table including:
(c1) obtaining the latch for a selected bucket group in exclusive mode;
(c2) allocating a memory location for an array of overflow buckets;
(c3) updating the overflow pointer in the group header for the selected bucket group to point to the memory location; and
(c4) redistributing buckets in the inline hash buckets and the array of overflow buckets.

12. The method of claim 11 further comprising defining the hash buckets to be storable in alignment with cache line boundaries in a specified data cache.

13. The method of claim 12 further comprising maintaining the set of properties entries in each hash bucket in a linked list.

14. The method of claim 11 further comprising maintaining the set of properties entries in each hash bucket in a linked list.

15. The method of claim 14 further comprising maintaining a set of unused entries in each hash bucket in a linked list.

16. The method of claim 11 further comprising defining each bucket group to be storable in alignment with cache line boundaries in a specified data cache.

17. The method of claim 11 in which resizing the hash table includes:
launching an asynchronous thread to carry out the resizing, wherein the asynchronous thread determines the load factor for a selected bucket group; and
resizing the selected bucket group if the load factor is higher or lower than predefined thresholds.

18. The method claim 17 wherein the thread acquires the latch for the selected bucket group in exclusive mode to carry out an updating operation on the bucket group.

19. A method for generating a hash table for a collection of data items, the hash table comprising a set of bucket groups and hash buckets, the method comprising:
(a) defining each of the bucket groups to include a latch for the bucket group, a set of inline hash buckets, and a group header comprising a pointer definable to point to an array of overflow hash buckets;
(b) defining each hash bucket to comprise a set of properties entries, each properties entry comprising a pointer to an associated data item in the subset associated with the hash bucket and a set of representative values for the associated data item, wherein the set of representative values identifies the data item;
(c) obtaining the latch for a selected bucket group in exclusive mode;
(d) allocating a memory location for an array of overflow buckets;
(e) updating the overflow pointer in the group header for the selected bucket group to point to the memory location; and
(f) redistributing buckets in the buckets in the bucket group and the array of overflow buckets.

20. A method for providing a hash table for a collection of data items, the method comprising:
(a) providing a set of hash buckets in the hash table, each hash bucket being associated with a subset of the collection of data items, and wherein said hash table includes a set of bucket groups, each bucket group including a latch for the bucket group, a set of inline hash buckets, and a group header comprising a pointer definable to point to an array of overflow hash buckets, wherein the number of bucket groups in the hash table is based on the number of threads in the computer system, and on a limit defined such that a specified load factor for the hash table is no larger than the product of the number of bucket groups and the number of in line buckets in each hash bucket; and
(b) providing a set of properties entries in each of the hash buckets, wherein each properties entry includes a pointer to an associated data item in the subset associated with the hash bucket and a set of representative values for the associated data item, wherein the set of representative values identifies the data item.

21. The method of claim 20 further comprising defining the hash buckets to be storable in alignment with cache line boundaries in a specified data cache.

22. The method of claim 20 further comprising maintaining the set of properties entries in each hash bucket in a linked list.

23. The method of claim 22 further comprising maintaining a set of unused entries in each hash bucket in a linked list.

24. The method of claim 20 further comprising defining each bucket group to be storable in alignment with cache line boundaries in a specified data cache.

25. A computer readable medium including program instructions to be implemented by a computer for generating and maintaining a hash table for a collection of data items, the hash table comprising a set of bucket groups and hash buckets, each bucket group comprising:
  a latch for the bucket group;
  a set of inline hash buckets; and
  a group header comprising a pointer definable to point to an array of overflow hash buckets,
  and wherein the program instructions include instructions for resizing the hash table, implementing steps comprising:
  obtaining the latch for a selected bucket group in exclusive mode;
  allocating a memory location for an array of overflow buckets;
  updating the overflow pointer in the group header for the selected bucket group to point to the memory location; and
  redistributing buckets in the inline hash buckets and the array of overflow buckets.

26. The computer readable medium of claim 25 wherein each hash bucket is associated with a subset of the collection of data items, and wherein each hash bucket comprises a set of properties entries, each properties entry comprising a pointer to an associated data item in the subset associated with the hash bucket and a set of representative values for the associated data item, wherein the set of representative values identifies the data item.

27. The computer readable medium of claim 25 wherein each bucket group is defined to be storable in alignment with cache line boundaries in a specified data cache.

28. The computer readable medium of claim 25 wherein resizing the hash table includes launching an asynchronous thread to carry out the resizing, the asynchronous thread determining the load factor for a selected bucket group and carrying out the resizing for the selected bucket group if the load factor is higher or lower than predefined thresholds.

29. The computer readable medium of claim 25 wherein the resizing of the hash table further provides a thread determining the load factor for a selected bucket group and carrying out the resizing for the selected bucket group if the load factor is higher or lower than predefined thresholds, the thread acquiring the latch for the selected bucket group in exclusive mode to carry out an updating operation on the bucket group.

30. A computer readable medium including program instructions to be implemented by a computer for providing a hash table for a collection of data items, the program instructions performing steps comprising:
  (a) providing a set of hash buckets in the hash table, each hash bucket being associated with a subset of the collection of data items, wherein said hash table includes a set of bucket groups, each bucket group including a latch for the bucket group, a set of inline hash buckets, and a group header comprising a pointer definable to point to an array of overflow hash buckets; and
  (b) providing a set of properties entries in each of the hash buckets, wherein each properties entry includes a pointer to an associated data item in the subset associated with the hash bucket and a set of representative values for the associated data item, wherein the set of representative values identifies the data item;
  (c) carrying out a resizing of the hash table including:
    (c1) obtaining the latch for a selected bucket group in exclusive mode;
    (c2) allocating a memory location for an array of overflow buckets;
    (c3) updating the overflow pointer in the group header for the selected bucket group to point to the memory location; and
    (c4) redistributing buckets in the inline hash buckets and the array of overflow buckets.

31. The computer readable medium of claim 30 wherein the steps further comprise defining the hash buckets to be storable in alignment with cache line boundaries in a specified data cache.

32. The computer readable medium of claim 30 wherein the steps further comprise maintaining the set of properties entries in each hash bucket in a linked list.

33. The computer readable medium of claim 32 wherein the steps further comprise maintaining a set of unused entries in each hash bucket in a linked list.

34. The computer readable medium of claim 30 further comprising defining each bucket group to be storable in alignment with cache line boundaries in a specified data cache.

35. The computer readable medium of claim 30 in which resizing the hash table includes:
  launching an asynchronous thread to carry out the resizing, wherein the asynchronous thread determines the load factor for a selected bucket group; and
  resizing the selected bucket group if the load factor is higher or lower than predefined thresholds.

36. The computer readable medium of claim 35 wherein the thread acquires the latch for the selected bucket group in exclusive mode to carry out an updating operation on the bucket group.

37. A computer readable medium including program instructions to be implemented by a computer for generating and maintaining a hash table for a collection of data items, the hash table comprising a set of bucket groups and hash buckets, each bucket group comprising:
  a latch for the bucket group;
  a set of inline hash buckets; and
  a group header comprising a pointer definable to point to an array of overflow hash buckets, and
  wherein the number of bucket groups in the hash table is based on the number of threads in the computer, and on a limit defined such that a specified load factor for the hash table is no larger than the product of the number of bucket groups and the number of inline buckets in each hash bucket.

38. The computer readable medium of claim 37 wherein each hash bucket is associated with a subset of the collection of data items, and wherein each hash bucket comprises a set of properties entries, each properties entry comprising a pointer to an associated data item in the subset associated with the hash bucket and a set of representative values for the associated data item, wherein the set of representative values identifies the data item.

39. The computer readable medium of claim 37 wherein each bucket group is defined to be storable in alignment with cache line boundaries in a specified data cache.

* * * * *